United States Patent Office 3,387,663
Patented June 11, 1968

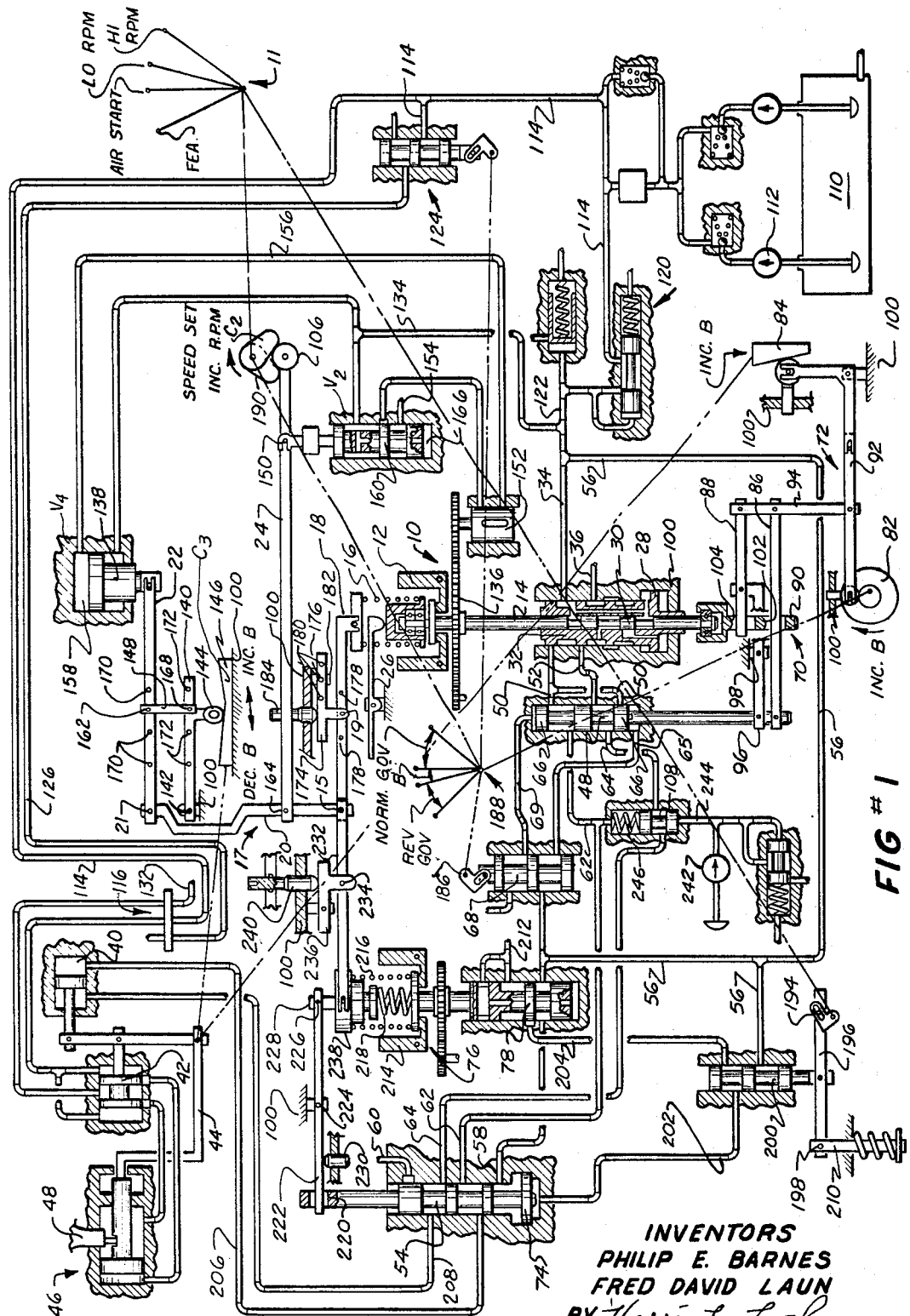

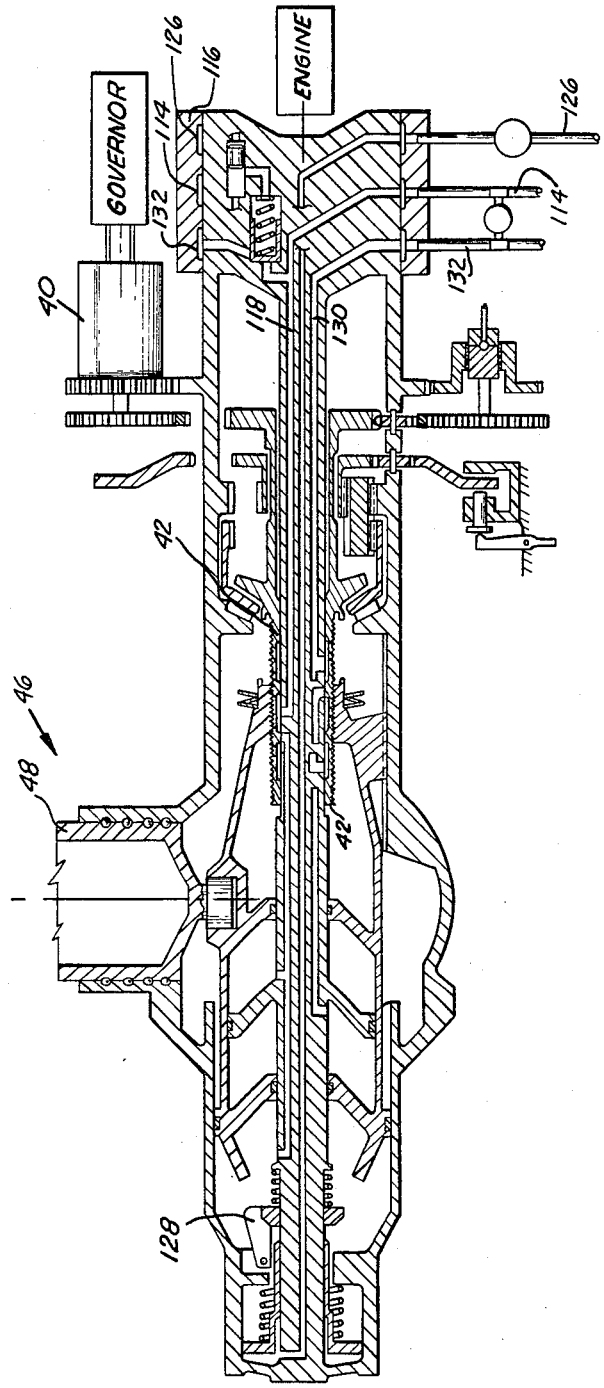

3,387,663
CONTROL MECHANISM
Philip E. Barnes, North Granby, and Fred D. Laun, Granby, Conn., assignors to United Aircraft Corporation, East Hartford, Conn., a corporation of Delaware
Filed Sept. 14, 1966, Ser. No. 579,366
26 Claims. (Cl. 170—160.2)

This invention relates to control mechanism for a controllable pitch propeller.

An object of this invention is a control mechanism incorporating overspeed governing means and means responsive to the normal speed governor setting for resetting the overspeed governor means.

Another object of this invention is a control mechanism having an air start safety circuit for limiting the rate of pitch reduction in airstarting an engine in flight.

A further object is provision for reversing the governor outlet connections and manually controlling the propeller pitch when changing from governed forward pitch control to governed reverse pitch control.

A still further object is to provide a governor control having a speed setting delay circuit, a system lead circuit having an independent lead adjustment and an independent gain adjustment circuit.

Other objects and advantages of the invention will become apparent from the following specification and claims and from the accompanying drawings which illustrate an embodiment of the invention.

FIG. 1 is a diagrammatic view of the control and its connections.

FIG. 2 is a schematic representation of a propeller adapted for use with the control of FIG. 1.

The present invention relates to a control system which is an improvement on the structure shown in Patents Nos. 2,923,361 issued Feb. 2, 1960, to S. G. Best, and 2,928,476 issued Mar. 15, 1960, to W. E. Diefenderfer and particularly adapted, but not limited, to operate in connection with a propeller of the type shown in Patent No. 3,312,586 of Barnes et al. issued Oct. 19, 1965. In such a propeller a control motor, preferably rotary hydraulic and usually mounted outside of the rotating portion of the propeller, is geared to drive a valve in the rotating portion of the propeller, which valve controls the flow of pressure fluid to and the drainage of fluid from a pitch changing motor, within the rotating portion of the propeller, mechanically connected to the propeller blades for changing the pitch of the blades. A mechanical feed back connection comprising a threaded nut secured to the pitch changing motor and a threaded sleeve, secured to the rotary and reciprocating portion of the valve, serves to translate the valve with translating movements of the pitch changing motor and to also translate the valve upon rotation of the control motor, and the threaded sleeve in the nut. In such a structure each rotative position of the control motor and hence each rotative position of the threaded sleeve and valve portion secured thereto, with respect to the propeller hub and pitch changing motor, when the valve is in a null position, and each relative position of the two parts of the control motor, when the valve is in a null position, represent a corresponding propeller pitch. A differential mechanism is geared to the valve, in a manner similar to the gear connection of the control motor with the valve, outside of the rotating portion of the propeller, to provide a mechanical drive, called a Beta feed back, or a blade position feed back, indicating the blade position at all times.

The control mechanism of the present application primarily controls the rotary control motor 40, shown diagrammatically in FIG. 1 as a reciprocating motor, for controlling the propeller pitch. A flyweight governor driven in timed relation with the propeller and indicated generally at 10 controls the flow of hydraulic fluid, usually engine oil, to and from the control motor 40.

The governor includes flyweights 12 operating directly on a governor control valve stem 14 and opposed by a speeder spring 16. The force of the speeder spring 16 is adjustable to vary the speed setting of the governor by a cam C2 controlled by a condition lever indicated generally at 11. The cam C2 operates through a linkage system and a servo pilot valve $V_2$ and servo piston 138 to change the governor speed setting.

The servo pilot valve $V_2$ has a null position and is connected with the linkage system 17, acting as a feed back, to position the speeder spring in accordance with the position of a control cam C2 operating the portion 24 of the linkage system 17 to which the servo pilot valve $V_2$ is connected. Hence, the position of the control cam C2 will determine the force on speeder spring 16 of the governor 10 under steady state conditions.

This linkage system includes a blade angle feed back mechanism, including cam C3, providing a pitch control system proportional to speed error. It also provides a gain adjustment for the linkage system and a lead time adjustment for the pitch angle feed back. The servo system provides a lag in the control system substantially equal to the lag in the engine speed changes, all of which is explained hereinafter.

The pressure fluid from pressure line 34 and the return fluid to drain line 36, controlled by the double acting governor control valve 32, passes through other valves on its way to and from the motor 40 operating the blade pilot valve 42. These other valves include a valve 48 for reversing the connections of the governor lines 50 and 52 for governing in reverse and a feathering valve 54 for substituting a positive pressure from lines 56, 58 and an independent drain through line 60 for the governor controlled lines 50, 52, 62, 64 when it is desired to hydraulically feather the propeller. An air start sequencing valve 108 is provided in the low pitch pressure line between the reversing valve and the feathering valve and is used, when it is desired to use the propeller as a windmill for the purpose of starting an engine in flight, to substitute a controlled flow of pressure fluid from an auxiliary pump for taking the propeller out of feather and reducing its pitch at a controlled rate, instead of relying on the flow through the governor, which is of course in an under speed condition when the propeller is in feathered position.

An over speed governor is also provided which is adjustably set by the linkage selecting the speed setting of the normal governor, to about 104 percent of the speed setting of the normal governor. The over speed governor generally indicated at 76 operates to actuate the feathering valve and thus control the propeller independent of the main or normal governor to thus provide a pitch setting from which the propeller may be feathered hydraulically independent of the main governor if desired.

The propeller may be rotatably mounted in, and supported by, an engine nose section to form what is now well known as a nose mounted propeller. The pumps including the pumps driven by rotation of the propeller, the transfer bearing, and the hydraulic control motor may be housed within the nose section (not shown) which in turn may be bolted directly to the engine to form a support for the propeller and provide a driving connection between the engine and the propeller. A housing enclosing the control mechanism about to be described may be mounted on the nose housing and the electric motors for driving auxiliary pumps may also be mounted on the nose housing. The nose housing may also enclose both the atmospheric and the pressurized sumps containing the fluid for operating the pitch changing mechanism. The drain lines of the system connect generally with the atmospheric sump (not shown) and operating fluid is fed from the atmospheric sump to the pressurized sump.

Hydraulic fluid, preferably engine oil, is drawn from the pressurized sump 110 by a main pump 112 and fed through mechanism comprising the usual main check valve, filter and filter bypass into a main pressure line 114 one branch of which feeds directly through the transfer bearing 116 to the pressure supply line 118 to the pitch control valve in the propeller.

Another branch of the main pressure line 114 leads to a pressure regulating valve shown generally at 120 which provides line 122 and the control system with pressure fluid at a controlled pressure. Another branch of the pressure line 114 leads to a low pitch stop retraction valve shown generally at 124 which controls the pressure in line 126 leading to the transfer bearing 116 and then to the low pitch stop mechanism 128, FIG. 2, in the forward portion of the propeller. The drain line from the pitch changing motor and the control valve 42 leads through the transfer bearing to a line 132 discharging into the nose housing and atmospheric sump (not shown). The controlled pressure in line 122 is fed through line 34 to a governor valve 32, through a branch line 134 to a pilot valve $V_2$ and a servo piston $V_4$, and through another branch 56 to a reverse governing valve, an overspeed governor valve, and a feathering pilot valve which will be described later. A drain line 36 which empties into the nose housing is also connected with the valve 32. The lines 50 and 52 are selectively connected by the governor valve 32 with the pressure line 34 or the drain 36. The lines 50, 52 are connected through a series of other valves to be described later, with the control motor 40 so that operation of the governor valve 32 will effect operation of the control motor 40. The governor control valve 32 includes a one-half area servo piston 28, the upper portion of which is continuously connected with the pressure line 34 and the larger lower area is controlled by a governor pilot valve 30 on the governor controlled valve stem 14 to provide additional operating force for the governor control valve 32. The governor valve stem 14 is reciprocated in one direction by flyweights 12 which may be driven in timed relation with the propeller by gearing meshing with gear 136 and is reciprocated in the other direction by a speeder spring 16. The force of speeder spring 16 is adjusted by a system of cams and linkages to provide a selected speed setting.

A cam C2 which may be set by a condition lever 11 coacts with roller 106 rotatably mounted on the end of a linkage 24 the other end of which is pivoted on link 20. The lower end of link 20 is pivoted at 15 to one end of a link 18 at the other end of which is mechanism for applying pressure to the speeder spring 16. The link 18 is provided intermediate its ends with a pivot 19 connecting the link with a fixed portion 100 of the control housing and support and forming a fixed abutment for the pivot 19. The upper end of the vertical lever 20 is pivoted at 21 to one end of a horizontal lever 22 the other end of which is pivotally connected with the piston 138 of the servo piston $V_4$. A lever 140 is pivoted at one end at 142 on a pivot fixed in the housing 100. The lever 140 is provided adjacent its other end with a roller 144 which is a follower for and contacts with Beta feed back cam 146 which is positioned by mechanism described later in accordance with each particular pitch of the propeller blades. The cam 146 slides along the housing 100 and serves as an abutment for the lever 1440. Lever 140 is connected to the link 22 by a link 148 pivoted at one end to the lever 140 and at the other end to an intermediate portion of the link 22. Cam 146 and its support 100 therefore serves through the medium of link 148 as an abutment about which the link 22 may pivot as it is moved by the piston 138 of the servo $V_4$.

A speed setting pilot valve $V_2$ is pivoted at 150 intermediate the ends of link 24 and is provided with a drain 154. Valve $V_2$ will selectively connect the pressure line 134 or the drain line 154 with a chopper 152 driven by the gear 136 in timed relation with the propeller to regulate the flow of hydraulic fluid through line 156 to and from the variable pressure chamber 158 of the servo piston $V_4$ to gradually change the position of the piston 138 as long as the piston 160 and the pilot valve $V_2$ is off of its central or null position.

Movement of the cam C2 by the condition lever 11 to change the speed setting of the governor will move the piston 160 of the speed setting pilot valve $V_2$ off of its central position and start movement of the piston 138. Speeder spring 16 continuously urges link 18 against pivot 19 and its abutment and through link 20 urges link 22 down against its pivotal connection with link 148 and its abutment and urges the other end of link 22 upwards against its pivotal connection with the servo piston 138. Hence, movement of the piston 138 in either direction will cause the link 22 to move about its pivotal connection 162 and through link 20 and its pivotal connection to move the link 18 about its pivot 19 and change the force on speeder spring 16. As link 24 is pivotally connected at 164 to link 20 and is forced upward by pressure in the chamber 166 under the piston 160 of valve $V_2$ so as to force the roller 106 into contact with the cam C2, movement of the link 20 will cause the link 24 to pivot about its contact with the cam C2 and return the piston 160 to its null position as the piston 138 of the servo piston $V_4$ is operated incident to the offcenter position of the pilot valve $V_2$. The chopper 152 and the capacity of the chamber 158 serves to provide a delay in the change in the speeder spring setting, responsive to a call for change by movement of the cam C2, which delay or lag is essentially equal to the engine speed change lag responsive to a change in propeller pitch and thus removes thrust dip or change usually associated with changes in speed settings where no lag is provided as well as providing dynamic stability. The lag or delay is determined by the capacity of the pilot valve $V_2$ and chopper with respect to the volume of the servo piston chambers 74.

The control system from the governor, generally indicated at 10, to the propeller and engine may be called a forward system which has a lag in speed response of the propeller from a movement of the governor valve to an offcenter position which lag is due primarily to the time required for the engine speed to respond to a change in propeller pitch. The governor control system including the speed setting pilot valve $V_2$, the servo piston $V_4$, and the Beta feed back cam 146 constitute a feed back system resetting the governor spring to bring the governor valve back into a central position. This feed back system has a lag due to the capacity of the speed setting pilot valve $V_2$ and the speed setting servo piston $V_4$ and because it is in a feed back circuit this lag is in effect a lead in the forward circuit and thus tends to equalize the engine-propeller lag in the forward circuit and provide a system which is capable of having a high gain and still retain stability.

As the lag in the feed back circuit, which is in effect a lead in the forward circuit, is dependent upon the linkage system connecting the servo piston $V_4$ with the pilot valve $V_2$, the extent of this lag can be varied by changing the linkage ratio between the servo piston $V_4$ and the pilot valve $V_2$. This may be accomplished by moving the link 148 with its pivots 162 and 168 into corresponding pivot holes such as 170, 172 to change the linkage ratio between servo $V_4$ and pilot $V_2$ without materially affecting the gain linkage ratio between the feed back cam 146 and the pilot valve $V_2$ and the speeder spring 16.

As the over-all gain in the circuit is controlled by the gain in the feed back circuit, the gain in the forward circuit may be made large enough to satisfy the desired transient pitch changing requirements, that is, the pitch change rate may be quite rapid. Stability will be maintained by adjusting the gain in the feed back circuit so as to limit the over-all gain while maintaining the desired stability. The gain in the feed back circuit may be adjusted independently of the lead circuit by moving the adjustable abutment 174 longitudinally of the link 18. This may be done by removing pivot 19 from the link 18 and removing pin 176 from the abutment 174 and after longitudinal movement of the abutment 174 replacing the pivot in one of the holes 178 in link 18 and replacing the pin 176 in one of the holes 180 and in the depending abutment 182 depending from a fixed portion 100 of the nose housing. A speed adjusting screw 184, contacting abutment 174, may be threaded into the housing 100 and adjusted to adjust the steady state speed governor speed setting.

The operation of the control mechanism is as follows: Starting from a steady state condition assume the condition lever is moved clockwise to turn cam C2 clockwise to increase the speed setting of the governor. Link 24 will be turned clockwise about pivot 164 and will depress pilot valve $V_2$. Pressure from line 134 will enter $V_2$ and hence to chopper 152 whose purpose is to increase the time delay of the control system, and be directed to line 156 and the chamber 158 above servo piston 138 to force piston 138 downward. Downward movement of piston 138 will turn lever 22 clockwise about pivot 162, move link 20 upward, turn lever 18 clockwise about pivot 19 and compress speeder spring 16 which will increase the speed setting of the governor. The upward movement of link 20 will also move pilot valve $V_2$ upward and if the upward movement of link 20 continued long enough the pilot valve $V_2$ would be returned to a null position and further change of the speeder spring halted with the system at a steady state condition.

Compression of speed spring 16 will force governor pilot valve 14, 30 down, draining fluid from under the piston 28, force governor valve 32 down and connect line 52 with pressure line 34 and line 50 with drain. This will put pressure in line 208, and drain line 206 which will move servo motor 40 to decrease the pitch to permit an increase in speed. The speed will increase through an inertial time lag about equal to the time taken by the control mechanism to recenter the pilot valve $V_2$. If this were the only control, and as the motor 40 continues to operate and the pitch reduce as long as the governor valve is off center, the pitch change rate would have to be slow and even then the blades might well have a pitch too low to maintain the selected speed and the device might overspeed and hunt.

Movement of the blades in reducing pitch will move feed back cam 146 to the left which will turn lever 140 clockwise about pivot 142 and through link 148 turn lever 22 counterclockwise about its connection with piston 138. This movement will lower link 20, turn lever 18 counterclockwise about pivot 19 and reduce the force on spring 16 and temporarily reduce the initial speed setting signal to the governor. Lowering of link 20 will also push pilot valve piston 160 of pilot valve $V_2$ downward and acting as a negative feed back increase the amount that piston 160 has been displaced from its null position. Thus piston 138 will now have to travel down further to restore piston 160 to its neutral position and this further travel takes longer and constitutes a time delay or lag in the feed back circuit. This time delay in the feed back circuit is the equivalent of a lead in the forward circuit and tends to cancel the engine-propeller inertial lag, so that the rate of pitch change may now be rapid with less overshooting and better stability. The governor will not deviate far from its on speed position but will provide rapid pitch change and speed correction with stability.

Adjustment of abutment 174 to the right will cause link 20, piston 138 and cam 146 to have less effect on the speeder spring 16, and hence will increase the gain of the control system independent of the lag which is determined by the time taken by piston 138 restore valve $V_2$ to its central position.

Adjustment of link 148 to the left will increase the lag in the system because the change in pivot 162 will make piston 138 travel farther (take longer) to restore link 20 and link 24 to a position where valve $V_2$ piston 160 will be in a neutral position. Movement of link 148 and pivot 168 to the left will also cause cam 146 to impart less movement to link 148, pivot 162 and pivot 21 for any given movement of cam 146. By making the distance from pivot 142 to the center line of link 148 the same as the distance from pivot 21 to the center line of the link 148, any given rate of movement of cam 146 will require the same fixed displacement of link 20 and piston 160 to give the same rate of movement of piston 138 as dictated by the linkage geometry regardless of the position of link 148.

Thus the gain reducing signal to the governor speeder spring 16 for a given rate of change of blade angle or cam 146 is independent of the position of link 148. However the movement of piston 138 and the resulting time delay will otherwise be proportional to the ratio of the portions of lever 22 on opposite sides of the link 148 and pivot 162. Hence adjustment of link 148 will not affect the gain action of cam 146 when moving to a predetermined new position, but will modify the time required to produce a given movement of link 20 by the piston 138 independent of the gain of the system. It should be pointed out that although individual actions such as speed setting and feed back resetting have been separately described, these actions operate more or less in cooperative unison so that stable operation is reached at the new condition of operation.

Movement of condition lever 11 in a counterclockwise direction will operate the several control members including the propeller pitch in a direction opposite to that described for increasing the speed setting of the governor and reduce the speed setting of the governor and increase the propeller pitch.

It will be appreciated from the above description that an adjustable control mechanism has been provided in which the effective lead in the control system may be independently adjusted to match the lag in the forward circuit and the over-all gain may be adjusted independent of the lead. In the event of signs of instability the gain can be adjusted to restore stability while retaining the optimum system lead. The independent lead adjustment permits matching of the effective lead of the control circuit with the lag of the forward circuit without affecting the desired system gain.

The reversing valve 48 is located between lines 50 and 52, leading from and controlled by the governor, and lines 62, 64, leading from the reversing valve 48 to the control motor 40 in the propeller. The reversing valve 48 upon actuation is effective to reverse the connections between these two sets of lines so that line 50 instead of feeding line 62, as in the forward position, will feed line 64 in the reverse position. Likewise, line 52 feeding line 64 in the forward position will feed line 62 in the reverse position so that the governor may be effective to control the propeller pitch with the blades in a reverse position. The reverse valve 48 is hydraulically urged to the position for normal (forward) governing as shown in FIG. 1 by pressure fed through lines 56 and 65 acting on the piston 66 and controlled by the reverse governing control valve 68. Upon actuation of the control member 186 by the power lever shown generally at 188 the control valve 68 will be forced upward to connect the line 65 with drain and apply pressure through lines 56 and 69 to the top of the piston 66 and force the valve 48 down and thus reverse the governor outlet connections.

In changing from forward governing to reverse governing, which is done by actuation of the power lever 188, it is desirable for stability to have a region of manual control between the two governor regions. In this region the power lever 188 will operate cam 190 and, acting on roll 106 on link 24, will force the pilot valve 160 ($V_2$) downward to compress the speeder spring 16 and the valve stem 14.

The reversing valve 48 is connected by linkage 70 with the governor valve, which linkage is also connected with linkage 72, operable for manually selecting the propeller pitch, including a feed back 84 from the blades, similar to the feed back to cam 146, so that the blades will assume the selected position.

The switch over or reversing valve 48, the governor valve 14, 32, the Beta set cam 82 and the blade positioned follow up cam 84 as shown in the drawing are in the forward governing position. In this position the Beta set cam 82, which is positioned by the power lever, is maintained in a position such that the levers 86 and 88 which are located in slots in the governor control valve stem extension 90 do not contact the extension 90 so that the stem 14, 90 may be freely moved under the influence of the flyweights 12. During all forward governing regimes and during the first part of the Beta control while reducing pitch in going from forward to reverse governing the switch over valve is held in its upward position. A floating lever 92 has one end positioned by Beta set cam 82 and the other end positioned by follow up cam 84, representing actual blade angle, and is connected at an intermediate portion with a link 94 connecting with the one end of levers 86 and 88. The other end of lever 86 is connected with the switch over valve 48. The other end of lever 88 is located in a slot in extension 90 and is connected at an intermediate position with one end of lever 96. The other end of lever 96 is connected with switch over valve 48 and is pivoted at a point intermediate its ends on a fixed support 98 in the valve housing 100.

When the power lever is turned to bring the propeller into the Beta control regime the cam 190 is turned counterclockwise to depress pilot valve $V_2$ and through the servo piston $V_4$ set the governor at a high speed (low pitch) position by compressing spring 16 and forcing pilot valve 30 and valve stem extension 90 down so that the upper portion 102 of the lever slot in extension 90 will contact the upper surface of lever 86. The power lever will position the cam 82 at the desired blade angle and the follow up cam 84 will proceed to move lever 92 and 86 and pilot valve 30 upward to cut off fluid flow to the propeller servo motor 40 and locate the propeller at the desired blade angle.

At a selected position in the Beta control regime the reverse governing control valve 68 is actuated by the power lever 188 and the switch over valve 48 is forced downward to reverse the governor connections to permit governing in reverse. Downward movement of switch over valve 48 will carry lever 86 away from slot upper portion 102 and will force lever 88 upward so that the upper portion of lever 88 will contact the upper portion 104 of the upper slot. As the portion of lever 88 in the upper slot in extension 90 moves in the opposite direction to the portion of lever 86 in the lower slot in extension 90, positioning of cam 82 will have a reverse effect on pilot valve 30 to compensate for the reversal of the governor connections by the switch over valve. Further movement of the power lever will remove cam 190 from contact with roller 106 so the governor speed control will be returned to the condition lever and cam C2 positioned thereby.

Lines 62, 64 leading from the governor to the control motor 40 pass through a feathering valve 54 which normally conducts the governor control fluid without interference. The feathering valve is normally held in a downward position as shown in the FIG. 1 by pressure fluid introduced through the lines 56 and 58 onto the top of a one-half area piston 74. The valve 54 is provided with an independent drain line 60. When it is desired to feather the propeller the condition lever 11 is turned to the feathered position which will operate cam 194 to turn cam 194 counterclockwise and force lever 196 counterclockwise upward about pivot 198 and force the valve 200 upward. This upward movement will disconnect line 202 from line 204, which normally drains through the overspeed governor valve 78, and connect line 202 with pressure line 56 and apply the control pressure from line 56 through line 202 to the larger underside area of the piston 74 and force the feathering valve upward. Such upward movement of the feathering valve 54 will short circuit increased pitch line 62 by connecting it with decrease pitch line 64 and will connect increase pitch line 206 on the output side of feathering valve 54 with the control pressure in line 58 and will connect decrease pitch line 208 with the drain line 60 to permit operation of the control motor 40 to operate pitch control valve 42 and hydraulically increase propeller pitch to feather position independent of any governor control. The feathered position may be determined by a mechanical stop or by the mechanical feathering mechanism (not described) of the propeller. By operating the cam 194 in a clockwise direction from the central position shown in the figure the valve 200 may be brought down to a disarmed position where the negative torque signals or the automatic feathering signals sent into rod 210 by well known mechanism, not shown, will be insufficient to actuate the feathering valve.

The overspeed governor 76 normally operates in an underspeed condition so that line 204 is normally connected through the valve 78 with the drain 212. The overspeed governor is driven in a manner similar to governor 10 by any suitable means (not shown) in timed relation with the propeller and has flyweights 214 and a pair of independently actuated parallel acting speeder springs 216 and 218. The overspeed governor is normally set at about 104 percent of the speed setting of the normal governor by mechanism to be described later and is thus normally at an underspeed condition in which it acts to connect pressure line 56 with pressure line 58 leading to the feathering valve and to connect line 204 with drain line 212. Upon attaining overspeed the governor valve 78 will be lifted to connect the line 204 with the pressure line 56 and actuate the feathering valve 54 to increase the propeller pitch. The overspeed governor will then meter pressure fluid into the lines 204 and 202 to thus control the propeller speed at about 104 percent of normal speed by operation of the feathering valve 54. When the feathering valve is lifted a portion 220 thereof will contact the lower side, adjacent one end, of lever 222 which is mounted on a fixed pivot at 224 and pivoted at the other end to a stem 228 acting on the upper end of speeder spring 218. This lever 222 acts as a feed back to reset the overspeed governor to a higher speed setting and stop the increase in pitch so as to prevent overshooting and cycling. In this system, which is really a loop, each operative position of the feathering valve 54 has a corresponding overspeed setting increment of the governor speeder spring 218 so that the overspeed governor is able to hydraulically actuate the feathering valve 54 to control the propeller pitch at a preselected speed and with a satisfactory degree of stability. An adjustable abutment 230 is provided for the lever 222 and establishes the minimum setting of the overspeed governor spring 218 and thus acts to determine the maximum underspeed setting of the overspeed governor. Except when the lever 222 is actuated by the feathering valve 54 the abutment 230 determines the setting of speeder spring 218 and any adjustments made incident to changing the setting of the main speed governor 10 will vary the setting of speeder spring 216 and will vary the speed setting of the overspeed governor from that determined by the abutment 230.

A lever 232 is pivoted at 15 to link 20 of the control linkage system 17 and is pivoted intermediate its ends on a pivot 234 on an adjustable abutment 236 and at its other end is pivoted to a spring platform 238 acting on the speeder spring 216. Link 232 will therefore adjust the speed setting of the overspeed governor in the same direction as, and at the same time that, the speed setting of the main governor 10 is adjusted by movement of the link 20. Thus, the overspeed governor setting may be maintained at 104% of the main governor setting at all speed settings and at the same time will anticipate a main governing system "failure" signal of decreasing blade angle fed to the speeder spring while r.p.m. is "increasing." (The normal dynamic sense of r.p.m. and blade angle is decreasing blade angle because r.p.m. is decreasing.) Abutment 236 may be longitudinally adjusted with respect to its supporting fixed abutment 100 and lever 232 to change the lever ratio between pivot 15 and the spring platform 238 to adjust the gain between the linkage system 17, including the link 20 and the speeder spring 16, and the speeder spring 216. An adjustable abutment 240 acting on abutment 236 may be utilized to adjust the setting of the overspeed governor.

For economy or other reasons it is sometimes desirable to feather a propeller in flight and thus stop the engine and then at some later time restart the engine in flight. This may be done by unfeathering the propeller to a position where it will windmill and thus rotate the engine at a speed sufficient to insure starting. A negative torque release (not shown) is usually provided which will disconnect the propeller from the engine when a preselected negative torque is attained. This is a safety feature which will prevent an undue drag in the event of an engine failure. In starting an engine by windmilling the propeller in flight, care must be taken to not exceed the torque of the negative torque decoupler or the propeller may be cut free from the engine and will tend to overspeed. If the normal governor, which is, of course, at an underspeed setting because it is not rotating at full r.p.m., is relied on to supply pitch reducing fluid pressure, the propeller pitch will be reduced so rapidly that the torque supplied by the propeller may go beyond the setting of the negative torque clutch before the engine can be started. In order to overcome this difficulty a separate auxiliary pump is supplied as shown schematically at 242 which pump may draw fluid from the same sump 110 as the main pump 112. The auxiliary pump 242 may be driven by any suitable means such as an electric motor (not shown) and will supply pressure to a line 244 leading to the underside of an air start valve 108 normally forced into the position shown in FIG. 1 by spring 246. Valve 108 normally passes the decrease pitch pressure fluid from the main governor to the control motor 40 but when the auxiliary pump 242 is started it will move the valve 108 against the action of spring 246 thus blocking the governor decrease pitch line 64 and connecting the auxiliary pump pressure line 244 with the portion of line 64 leading to the control motor 40. The air start auxiliary motor and pump are of such a size and will supply fluid at such a rate that the control motor 40 will be operated under a controlled condition and at a rate which will not decrease the pitch rapidly enough to release the negative torque clutch. The air start auxiliary motor and pump 242 are under the control of the pilot and may be started and stopped as desired to provide a controlled air start system. After the engine has started the auxiliary pump 242 will, of course, be stopped and the control returned to the normal governor, usually after normal governing speed has been attained.

From the above it can be seen that I have provided a combination of control elements, which acting in combination will provide a maximum rate of pitch change and retain stability of control, will provide manual propeller control, will automatically provide governing in reverse, and may be brought from reverse pitch position through manual control to a forward pitch position. This control will automatically set the overspeed governor to a setting a predetermined amount above the normal governor speed setting, and provide a feed back for resetting the overspeed governor to permit rapid protection therewith. Means are also provided for feathering the propeller independent of the normal speed governor and for unfeathering the propeller at a controlled rate to permit air-starting.

It is to be understood that the invention is not limited to the specific embodiment herein illustrated and described, but may be used in other ways without departure from its spirit and that various changes can be made which would come within the scope of the invention which is limited only by the appended claims.

We claim:

1. In a control for a controllable pitch propeller having blades and a blade pitch changing motor, control means including a speed responsive governor having an adjustable speed setting and providing a motor controlling signal, means supplying speed setting input signal to said control means including a feed back from the position of said propeller blades, said control means including means transforming said input signal into a governor speed setting output signal including means temporarily resetting the governor speed setting to reduce a difference between the speed of the controlled propeller and the governor speed setting, means incorporating a time lag in said transforming means, means adjusting the amount of said lag and means, independent of said lag adjusting means, adjusting the gain of the said transforming means.

2. In combination with a governor adapted to control the speed of a propeller and having a speeder spring, a control for said governor including a linkage system, a servo piston operatively connected by a first lever to one end of said system, said speeder spring operatively connected by a second lever to the other end of said linkage system for adjustment by said servo piston, a pilot valve, controlling said servo piston, and a governor speed selector connected by a third lever means to an intermediate portion of said linkage system, means for adjusting the lag of the control including means adjusting the lever ratio of said first lever, and means adjusting the gain of the control independent of said lag including means adjusting the lever ratio of said second lever.

3. In combination with a propeller having a motor controlling the pitch of the propeller blades, a governor having speed responsive mechanism and a pilot valve actuated by said speed responsive mechanism, controlling said motor a reversing valve having a forward position and a reversing position for reversing the sense of said governor to permit governor control in both forward and reverse pitch, means mechanically connecting said reversing valve with said pilot valve, including a lost motion connection, whereby said pilot valve may be actuated independent of said reversing valve and its connections during governing operation, means responsive to propeller blade pitch actuating said connecting means and said pilot valve, independent of said speed responsive mechanism, including manually actuatable pitch selecting means to manually select said blade pitch between the forward and reverse pitch governor controlled regimes, said connecting means including means reversing the mechanical connection between said pilot valve and said blade pitch responsive means when said reversing valve is in reversing position.

4. A combination as claimed in claim 3 in which the connecting means includes one linkage system moving said pilot valve in one direction upon movement in one direction of said means responsive to propeller blade pitch and another linkage system moving said pilot valve in the opposite direction upon said movement in said one direction of said means responsive to propeller blade pitch and means actuated by said reversing valve for selecting the linkage to be effective.

5. In combination with a propeller pitch controlling governor having speed responsive mechanism and a pilot valve actuated by said speed responsive mechanism and controlling a pair of lines, a reversing valve in said lines, having a forward position and a reversing position for reversing the connection of said lines with said pilot valve, means disabling said speed responsive mechanism, means connected with said pilot valve and including manually actuate pitch selecting means and means responsive to propeller blade pitch change for actuating said pilot valve to manually select the blade pitch, and means responsive to the position of the reversing valve for reversing the action of said blade pitch on said pilot valve.

6. In combination with a reversible controllable pitch propeller having blade pitch changing means, a blade pitch controlling governor including mechanism responsive to propeller speed and a pilot valve actuated by said speed responsive mechanism and controlling lines leading to pitch changing means, a reversing valve for reversing the sense of said governor, means rendering said speed responsive means ineffective to control said pilot valve including means resetting the governor to an underspeed setting and connecting said pilot valve with means responsive to propeller blade pitch for actuating said pilot valve, and means responsive to the position of the reversing valve for reversing the action of said blade pitch changes on said pilot valve.

7. A combination as claimed in claim 6 including manually actuated means for selecting the desired pitch and moving said pilot valve from a null position and means responsive to the blade pitch restoring said pilot valve to the null position.

8. In combination with a controllable pitch propeller having pitch changing mechanism and a speed responsive governor for controlling the pitch of said propeller, a pitch reducing fluid line connecting the governor with said propeller, a source of fluid pressure of limited capacity, and means interrupting said line, blocking the flow of fluid from said governor to said propeller and supplying said limited capacity fluid pressure through said line to said propeller to reduce the propeller pitch at a controlled rate in flight.

9. A combination as claimed in claim 8 including an auxiliary source of pressure for supplying operating fluid to said governor and said pitch changing mechanism, said source of limited capacity comprising a separate auxiliary supply actuating said interrupting means.

10. In combination with the pitch changing motor of a controllable pitch propeller, a feathering valve, means operatively connecting said valve with said motor for controlling said motor by said valve, a servo piston for actuating said valve, an overspeed governor having a speeder spring and a pilot valve controlling the supply of fluid to said servo piston, feed back means feeding back from the position of said valve resetting the speeder spring of said overspeed governor.

11. A combination as claimed in claim 10 in which opening of said feathering valve by said servo piston will increase propeller pitch and will increase the spring force in the governor to set the governor at a higher speed setting and reduce the valve opening.

12. A combination as claimed in claim 10 in which the feed back means includes means limiting the minimum speed setting of said governor by said feed back means.

13. A combination as claimed in claim 10 in which the governor has two speeder springs, one of which is set by the position of the feathering valve and the other of which is adjusted by other means.

14. A combination as claimed in claim 13 including a main governor for controlling said pitch changing motor to control the propeller pitch and means for adjusting the speeder spring of said main governor to select the propeller speed, means actuated in response to movement of said adjusting means for adjusting said other spring proportional to the adjustment of said main governor speeder spring to maintain the setting of said overspeed governor a predetermined amount above the setting of the main governor.

15. A combination as claimed in claim 14 in which said last mentioned means includes means for manually adjusting the setting of said other spring.

16. A combination as claimed in claim 10 in which said servo piston has opposite sides of different areas and in which pressurized fluid is continuously supplied through said pilot valve to the smaller side of said servo and the larger side is connected with drain through said pilot valve during normal nonfeathering operation.

17. A combination as claimed in claim 16 in which the drain connection from said larger side includes a control valve having means for interrupting said drain line and substituting fluid under pressure to actuate said feathering valve to feathering position.

18. A combination as claimed in claim 17 in which the overspeed governor pilot valve selectively connects said larger side with pressure or drain to regulate the position of the feathering valve and control the propeller speed.

19. In combination with a propeller having variable pitch blades and pitch changing means including a motor, means for controlling said pitch changing means including a control valve and fluid lines operatively connecting said control valve and said motor, speed responsive means and a speeder spring moving said control valve, including a time delay means for setting said speeder spring, means for resetting said speeder spring including a feed back connection between said motor and said speeder spring, a feathering valve intercepting said lines between said control valve and said motor, a speed responsive overspeed governor controlling said feathering valve to control said pitch changing means, an operative connection between said feathering valve and said overspeed governor for setting the speed of said overspeed governor, other means for setting the speed of said overspeed governor, and an operative connection between said speeder spring setting and resetting means and said other means, for setting the speed of said overspeed governor in proportion to the setting of said speeder spring.

20. A combination as claimed in claim 2 in combination with an overspeed governor for assuming control of the propeller speed upon overspeed, said overspeed governor having a speeder spring, a lever for adjusting said overspeed speeder spring, connecting said overspeed speeder spring with said intermediate portion of said linkage system for maintaining the setting of said overspeed governor a predetermined amount above the speed setting of said first mentioned governor.

21. A control system for controlling the pitch of a propeller to control the speed thereof including a main governor controlling the pitch of the propeller and having a speeder spring, an overspeed governor having a speeder spring, said overspeed governor disabling said main governor control and controlling the pitch of the propeller upon overspeeding of said propeller a preselected amount above the speed setting of said main governor, means for adjusting the speed setting of said main governor, and means operatively connected with said adjusting means for simultaneously adjusting the speed setting of said overspeed governor to maintain the setting of said overspeed governor a preselected amount above the setting of said main governor.

22. In a control for a controllable pitch propeller having blades and a blade pitch changing motor, a speed responsive governor having a speeder spring and controlling said motor, means for adjusting said speeder spring including a feed back from said blades, an overspeed governor having a speeder spring and overriding said speed governor upon attaining a speed a preselected amount above the setting of said speed governor, means, operatively connecting said speeder springs and said feed back, simultaneously adjusting the setting of said speeder springs, including means, responsive to a malfunction evidenced by a governor request for decreasing blade angle while the speed is increasing, resetting said overspeed governor for a lower setting so that the overspeed governor will assume control.

23. A control as defined in claim 22 including a time delay mechanism connected with said feed back restoring said overspeed governor to a preselected speed setting.

24. In a control for a controllable pitch propeller having blades and a blade pitch changing motor, a speed responsive governor having a speeder spring and controlling said motor, means for setting said speeder spring comprising a pilot valve connected to said speeder spring and controlling a servo piston for setting said speeder spring, pivoted means connecting said servo piston to said speeder spring and said pilot valve to provide a time lag in setting said speeder spring and returning said pilot valve to a null position, a feed back from said blades connected to said pivoted connecting means by a parallelogram connection having an adjustable side forming an adjustable pivot for said pivoted connecting means and adjustable to vary the lag in the feed back system.

25. In a control for a controllable pitch propeller including means for setting the speeder spring as claimed in claim 24, means including an adjustable abutment having a force multiplying connection independent of said lag adjusting means, connected to said speeder spring setting means between said speeder spring and said pilot valve, said servo piston and said feed back and adjustable to vary the gain of said setting means independent of said lag.

26. In a control for a controllable pitch propeller having blades and a blade pitch changing motor, a speed responsive governor having a speeder spring and controlling said motor, means for setting said speeder spring comprising a pilot valve connected to said speeder spring and controlling a servo piston, pivoted means connecting said servo piston to said speeder spring and said pilot valve to provide a time lag and set said speeder spring and return said pilot valve to a null position, a feed back from said blades connected to said pivoted adjustable abutment having a force multiplying connection connected to said speeder spring setting means between said speeder spring and said pilot valve, said servo piston and said feed back and adjustable to vary the gain of said setting means.

No references cited.

EVERETTE A. POWELL, JR., *Primary Examiner.*